(12) United States Patent
Song

(10) Patent No.: US 9,001,890 B2
(45) Date of Patent: Apr. 7, 2015

(54) METHOD AND APPARATUS FOR VIDEO INTRAPREDICTION ENCODING AND DECODING

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1999 days.

(21) Appl. No.: 11/499,754

(22) Filed: Aug. 7, 2006

(65) Prior Publication Data

US 2007/0053433 A1 Mar. 8, 2007

(30) Foreign Application Priority Data

Sep. 6, 2005 (KR) ........................ 10-2005-0082628

(51) Int. Cl.
*H04N 7/12* (2006.01)
*H04N 19/14* (2014.01)
*H04N 19/147* (2014.01)
*H04N 19/61* (2014.01)
*H04N 19/593* (2014.01)
*H04N 19/11* (2014.01)

(52) U.S. Cl.
CPC ............ *H04N 19/14* (2014.11); *H04N 19/147* (2014.11); *H04N 19/61* (2014.11); *H04N 19/593* (2014.11); *H04N 19/11* (2014.11)

(58) Field of Classification Search
None
See application file for complete search history.

(56) References Cited

U.S. PATENT DOCUMENTS 6,157,676 A 12/2000 Takaoka et al.
6,198,508 B1 3/2001 Jang et al.
6,408,029 B1 6/2002 McVeigh et al.
(Continued)

FOREIGN PATENT DOCUMENTS

EP 0398328 A2 11/1990
EP 0895424 A2 2/1999
(Continued)

OTHER PUBLICATIONS

Wang: "MB adaptive field/frame coding for interlace sequences", 4. JVT Meeting; 61. MPEG Meeting; Jul. 22, 2002-Jul. 26, 2002; Klagenfurt,AT; (Joint Video Team of ISO/IEC JTC1/SC29/WG11 and ITU-T SG.16 ), No. JVT-D108, Jul. 26, 2002, XP030005380.*
(Continued)

*Primary Examiner* — Mehrdad Dastouri
*Assistant Examiner* — James Anderson, II
(74) *Attorney, Agent, or Firm* — Sughrue Mion, PLLC

(57) ABSTRACT

A method and apparatus for video intraprediction encoding and decoding are provided. The method includes dividing an input block into at least two areas; performing intraprediction on pixels of a first area using pixels of a neighboring block; determining spatial characteristics of pixels of the first area around a pixel of a second area, and determining reference pixels of the first area for prediction of the pixel of the second area based on the spatial characteristics; and predicting the pixel of the second area based on the determined reference pixels of the first area. The apparatus includes a block division unit which divides a block into at least two areas; an intraprediction unit which performs intraprediction; and an interpolation unit which determines spatial characteristics of pixels of the first area, determines reference pixels, and predicts the pixel of the second area based on the reference pixels of the first area.

24 Claims, 14 Drawing Sheets

(56) References Cited

U.S. PATENT DOCUMENTS

| | | |
|---|---|---|
| 6,614,484 B1 | 9/2003 | Lim et al. |
| 7,221,707 B2 | 5/2007 | Kimura |
| 7,643,559 B2 | 1/2010 | Kato et al. |
| 2004/0218668 A1* | 11/2004 | Hannuksela et al. .... 375/240.01 |
| 2005/0013365 A1 | 1/2005 | Mukerjee et al. |
| 2005/0074186 A1 | 4/2005 | Lu et al. |
| 2005/0220364 A1* | 10/2005 | Lee .............................. 382/300 |
| 2006/0008006 A1* | 1/2006 | Cha et al. .................. 375/240.16 |
| 2006/0171455 A1* | 8/2006 | Mohsenian .............. 375/240.03 |
| 2008/0130745 A1* | 6/2008 | Pandit et al. ............. 375/240.13 |
| 2011/0085593 A1 | 4/2011 | Wang et al. |

FOREIGN PATENT DOCUMENTS

| | | | |
|---|---|---|---|
| JP | 4219074 | A | 8/1992 |
| JP | 8186818 | A | 7/1996 |
| JP | 1175201 | A | 3/1999 |
| JP | 2000-36963 | A | 2/2000 |
| JP | 2002-58032 | A | 2/2002 |
| JP | 2004-140473 | A | 5/2004 |
| JP | 2005-70128 | A | 3/2005 |
| KR | 2003-0062341 | A | 7/2003 |
| KR | 10-2004-0070176 | A | 8/2004 |
| KR | 10-2004-007774 | A | 9/2004 |
| KR | 10-2005-0019809 | A | 3/2005 |
| KR | 10-2005-0049465 | A | 5/2005 |

OTHER PUBLICATIONS

Communication issued on Jun. 26, 2007 by the Korean Patent Office in the counterpart Korean Patent Application No. 10-2005-0082628.
Communication issued on Oct. 18, 2011 by the Japanese Patent Office in the counterpart Japanese Patent Application No. 2006-239049.
Wang, et al; "Macroblock adaptive Frame/Field Coding for Interlace Sequences", Motorola Inc., XP030005380, Jul. 22-26, 2002, pp. 1-12.
Gang, et al.; "The intra prediction based on sub block", ICSP'04 Proceedings, vol. 1, Aug. 31, 2004, XP010809662, pp. 467-469.
Wang, et al.; "Interlace Coding Tools for H.26L Video Coding", ITU-Telecommunication Standardization Sector, Study Group 16 Question 6, Video Coding Experts Group (VCEG), Dec. 4, 2001, XP002240263, pp. 1-20.
Teng, et al., "A new quadtree predictive image coder", Proceedings of the International Conference on Image Processing, vol. 2, Oct. 23, 1995, XP010196975, pp. 73-76.
Chen, et al., "A fast edge-oriented algorithm for image interpolation", Image and Vision Computing, vol. 23, No. 9, Sep. 1, 2005, XP027617940, pp. 791-798.
Zhao et al., "Towards an overview of spatial up-conversion techniques", Proceedings of ISCE, Sep. 24, 2002, XP008027127, 6 pgs.
Communication dated Jul. 13, 2012, issued by the European Patent Office in counterpart European Application No. 06119469.2.

* cited by examiner

METHOD AND APPARATUS FOR VIDEO INTRAPREDICTION ENCODING AND DECODING

CROSS-REFERENCE TO RELATED PATENT APPLICATION

This application claims priority from Korean Patent Application No. 10-2005-0082628, filed on Sep. 6, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to intraprediction of a video, and more particularly, to video intraprediction encoding and decoding using pixel information of a current block through directional interpolation in video intraprediction.

2. Description of the Related Art

The H.264/Moving Picture Expert Group (MPEG)-4/Advanced Video Coding (AVC) standard is a video compression standard which adopts various techniques such as multiple reference motion compensation, loop filtering, variable block size motion compensation, and context adaptive binary arithmetic coding (CABAC) for the purpose of improving compression efficiency.

According to the H.264 standard, a picture is divided into macroblocks for video encoding. After each of the macroblocks is encoded in all interprediction and intraprediction encoding modes, an appropriate encoding mode is selected according to the bit rate required for encoding the macroblock and the allowable distortion between the original macroblock and the decoded macroblock. Then the macroblock is encoded in the selected encoding mode.

In intraprediction, instead of referring to reference pictures, a prediction value of a macroblock to be encoded is calculated using the value of a pixel that is spatially adjacent to the macroblock to be encoded, and the difference between the prediction value and the pixel value is encoded when encoding macroblocks of the current picture. Intraprediction modes are divided into 4×4 intraprediction modes for luminance components, 8×8 intraprediction modes (in case of a high profile), 16×16 intraprediction modes, and an intraprediction mode for chrominance components.

FIG. 1 illustrates 16×16 intraprediction modes for luminance components according to the H.264 standard, and FIG. 2 illustrates 4×4 intraprediction modes for luminance components according to the H.264 standard.

Referring to FIG. 1, there are four 16×16 intraprediction modes, i.e., a vertical mode 0, a horizontal mode 1, a direct current (DC) mode 2, and a plane mode 3. Referring to FIG. 2, there are nine 4×4 intraprediction modes, i.e., a vertical mode 0, a horizontal mode 1, a DC mode 2, a diagonal down-left mode 3, a diagonal down-right mode 4, a vertical-right mode 5, a horizontal-down mode 6, a vertical-left mode 7, and a horizontal-up mode 8.

For example, when a 4×4 current block is prediction encoded in a mode 0, i.e., the vertical mode of FIG. 2, pixel values of pixels A through D adjacent above the 4×4 current block are predicted to be the pixel values of the 4×4 current block. In other words, the pixel value of the pixel A is predicted to be the pixel values of the four pixels of the first column of the 4×4 current block, the pixel value of the pixel B is predicted to be the pixel values of the four pixels of the second column of the 4×4 current block, the pixel value of the pixel C is predicted to be the pixel values of the four pixels of the third column of the 4×4 current block, and the pixel value of the pixel D is predicted to be the pixel values of the four pixels of the fourth column of the 4×4 current block. Next, the difference between the pixel values of pixels of the 4×4 current block predicted using the pixels A through D and the actual pixel values of pixels included in the original 4×4 current block is obtained and encoded.

In video encoding according to the H.264 standard, the current macroblock is encoded in a total of 13 modes including the 4×4 intraprediction modes and the 16×16 intraprediction modes and is then intraprediction encoded in the encoding mode having the smallest cost. This means that the current macroblock is intrapredicted in the four 16×16 intraprediction modes and the one having the smallest cost is selected. Each of the 4×4 sub-blocks of the current macroblock is intrapredicted in the nine 4×4 intraprediction modes, and the one having the smallest cost is selected for each sub-block. The cost of the selected 16×16 intraprediction mode and the sum of the costs of the selected 4×4 intraprediction modes are compared, and the mode having the smallest cost is selected.

In this way, intraprediction according to the related art uses pixels sampled from neighboring blocks of the current block to be intrapredicted, instead of using pixels included in the current block. As a result, when the video of the current block is very different from that of the neighboring blocks, the difference between an intrapredicted block and an actual block may be large. Since intraprediction according to the related art uses only pixel information of neighboring blocks without using pixel information of the current block to be intrapredicted, prediction and coding efficiency are limited.

SUMMARY OF THE INVENTION

The present invention provides a method of and apparatus for video intraprediction encoding/decoding in which a prediction block is formed using not only pixels of blocks neighboring the current block to be intrapredicted, but also pixels included in the current block in video intraprediction, thereby improving prediction efficiency and coding efficiency.

According to one aspect of the present invention, there is provided a method of video intraprediction encoding. The method includes dividing an input block into at least two areas, performing intraprediction on pixels of a first area of the at least two areas using pixels of a neighboring block, determining spatial characteristics of pixels of the first area around a pixel of a second area of the at least two areas and determining reference pixels of the first area for prediction of the pixel of the second area based on the spatial characteristics, and predicting the pixel of the second area based on the determined reference pixels of the first area.

According to another aspect of the present invention, there is provided an apparatus for video intraprediction encoding. The apparatus includes a block division unit, an intraprediction unit, and an interpolation unit. The block division unit divides an input block into at least two areas. The intraprediction unit performs intraprediction on pixels of a first area of the at least two areas using pixels of a neighboring block. The interpolation unit determines spatial characteristics of pixels of the first area around a pixel of a second area of the at least two areas, determines reference pixels of the first area for prediction of the pixel of the second area based on the spatial characteristics, and predicts the pixel of the second area based on the determined reference pixels of the first area.

According to still another aspect of the present invention, there is provided a method of video intraprediction decoding. The method includes receiving a bitstream including data for a first area that is intraprediction-encoded using pixels of a neighboring block, and data for a second area that is directionally-interpolated using pixel information of the first area, performing intraprediction-decoding on pixels of the first area, determining spatial characteristics of pixels of the first area around a pixel of the second area and determining reference pixels of the first area for prediction of the pixel of the second area based on the spatial characteristics, and predicting the pixel of the second area using the determined reference pixels of the first area.

According to yet another aspect of the present invention, there is provided a method of video intraprediction decoding. The method includes receiving data for a first area that is intraprediction-encoded using pixels of a neighboring block, wherein the first area is included in a plurality of areas divided from a block, performing intraprediction-decoding on pixels of the first area, determining spatial characteristics of pixels of the first area around a pixel of a second area and determining reference pixels of the first area for prediction of the pixel of the second area based on the spatial characteristics, wherein the second area is included in the plurality of areas, and predicting the pixel of the second area using the determined reference pixels of the first area.

According to yet another aspect of the present invention, there is provided an apparatus for video intraprediction decoding. The apparatus includes an intraprediction unit and an interpolation unit. The intraprediction unit receives a bitstream including data for a first area that is intraprediction-encoded using pixels of a neighboring block and data for a second area that is directionally-interpolated using pixel information of the first area, and performs intraprediction-decoding on pixels of the first area. The first area and the second area are included in a plurality of areas divided from a block. The interpolation unit determines spatial characteristics of pixels of the first area around a pixel of the second area, determines reference pixels of the first area for prediction of the pixel of the second area based on the spatial characteristics, and predicts the pixel of the second area using the determined reference pixels of the first area.

According to yet another aspect of the present invention, there is provided an apparatus for video intraprediction decoding. The apparatus includes an intraprediction unit and an interpolation unit. The intraprediction unit receives data for a first area that is intraprediction-encoded using pixels of a neighboring block, and performs intraprediction-decoding on pixels of the first area. The first area is included in a plurality of areas divided from a block. The interpolation unit determines spatial characteristics of pixels of the first area around a pixel of a second area, determines reference pixels of the first area for prediction of the pixel of the second area based on the spatial characteristics, and predicts the pixel of the second area using the determined reference pixels of the first area. The second area is included in the plurality of areas.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE PRESENT INVENTION

Hereinafter, certain exemplary, embodiments of the present invention will be described in detail with reference to the accompanying drawings.

Figure 3:
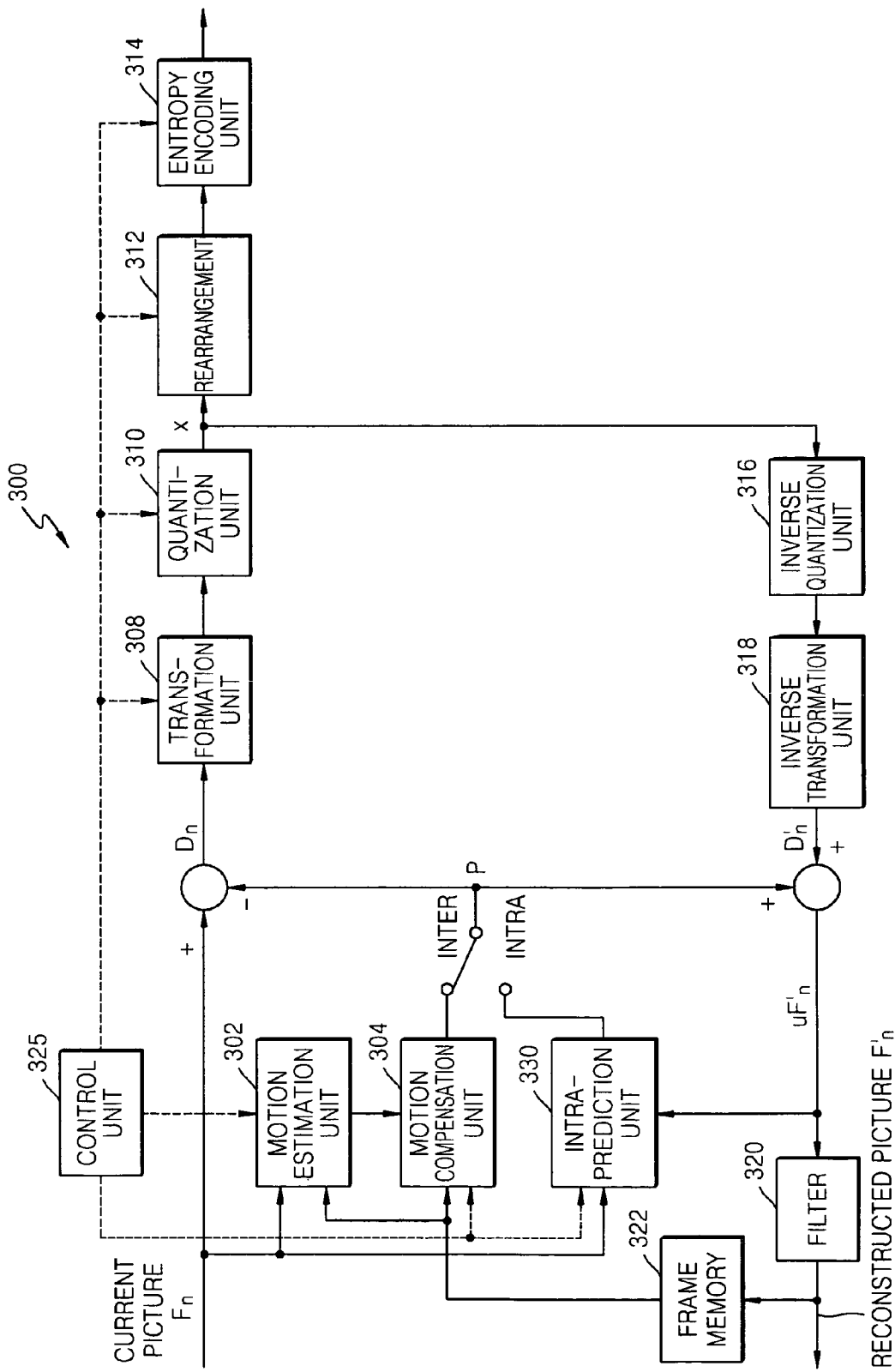
FIG. 3 is a block diagram of an illustrative video encoder which uses an apparatus for video intraprediction encoding according to an exemplary embodiment of the present invention.

FIG. 3 is a block diagram of a video encoder 300 which uses an apparatus for video intraprediction encoding according to an exemplary embodiment of the present invention. In the following description, for convenience of explanation, an apparatus for video intraprediction encoding according to the present invention is applied to an H.264 video encoder. However, the apparatus for video intraprediction encoding according to the present inventive concept may also be applied to other compression methods using intraprediction.

Referring to FIG. 3, an illustrative video encoder 300 includes a motion estimation unit 302, a motion compensation unit 304, an intraprediction unit 330, a transformation unit 308, a quantization unit 310, a re-arrangement unit 312, an entropy-coding unit 314, an inverse quantization unit 316, an inverse transformation unit 318, a filter 320, a frame memory 322, and a control unit 325. The intraprediction unit 330 is the apparatus for video intraprediction encoding according to an exemplary embodiment of the present invention.

For intraprediction, the motion estimation unit 302 searches in a reference picture for a prediction value of a macroblock of the current picture.

When a reference block is found in units of ½ pixels or ¼ pixels, the motion compensation unit 304 calculates the median pixel value of the reference block to determine reference block data. Interprediction is performed in this way by the motion estimation unit 302 and the motion compensation unit 304.

Figure 1:
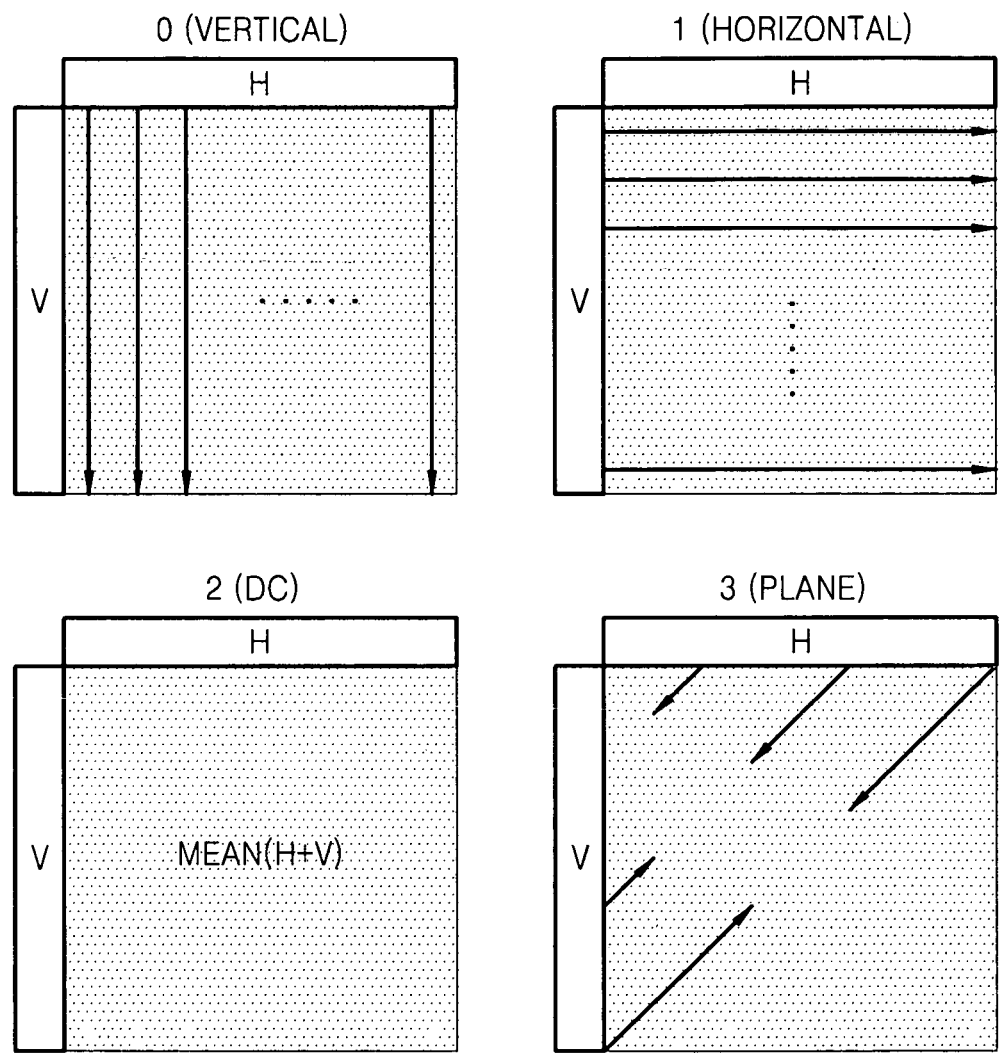
FIG. 1 illustrates 16×16 intraprediction modes for luminance components according to the H.264 standard.
Figure 2:
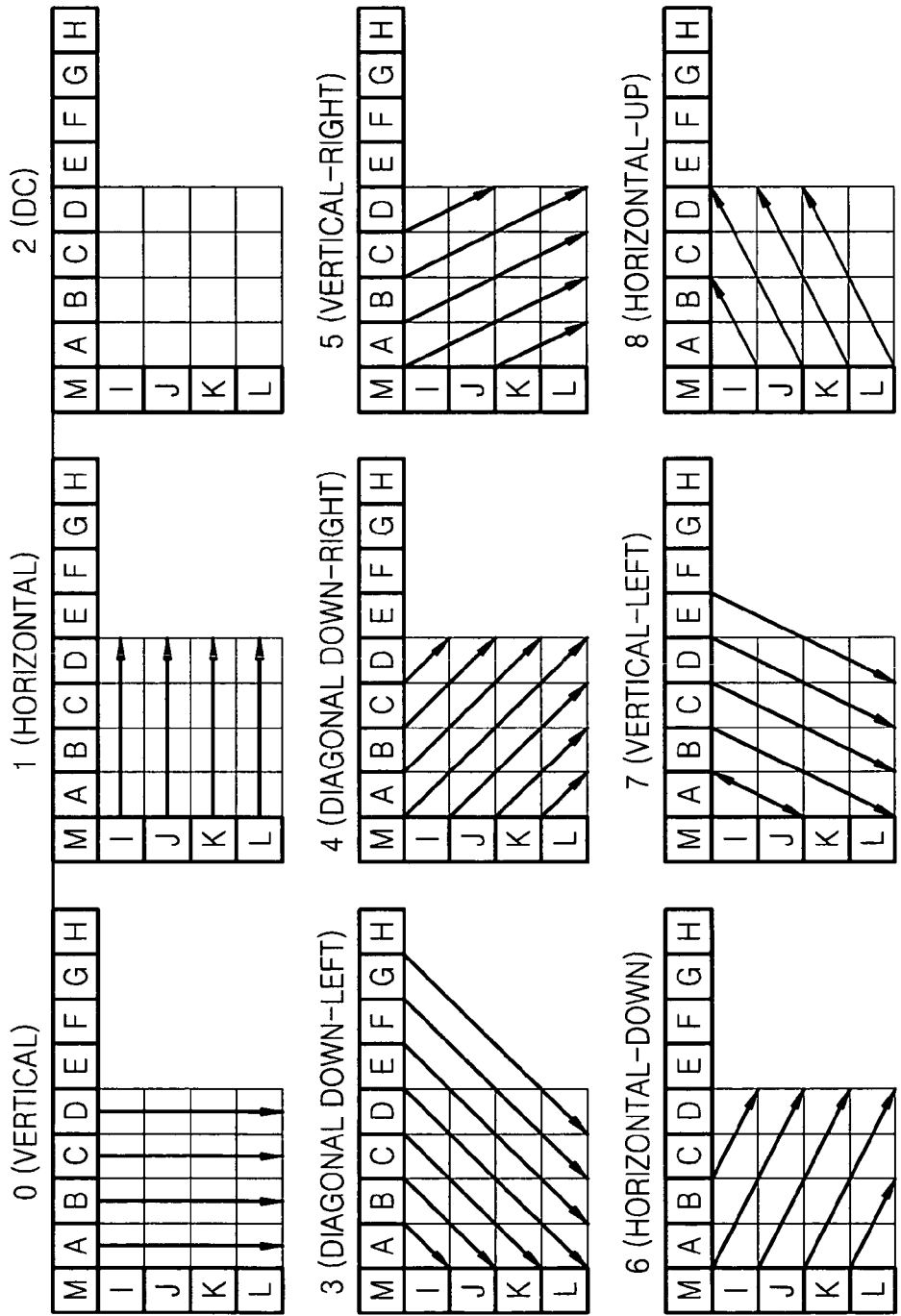
FIG. 2 illustrates 4×4 intraprediction modes for luminance components according to the H.264 standard.

The intraprediction unit 330 searches in the current picture for a prediction value of the current block for intraprediction. In particular, the intraprediction unit 330 according to an exemplary embodiment of the present invention receives the current block to be prediction-encoded and performs intraprediction encoding in 16×16 intraprediction modes, 4×4 intraprediction modes, or 8×8 intraprediction modes, and chrominance intraprediction modes as illustrated in FIGS. 1 and 2. The intraprediction unit 330 also divides the current block into at least two areas, performs intraprediction on one of the at least two areas, e.g., a first area, and then performs intraprediction through directional interpolation of the remaining area, i.e., a second area, using reconstructed information of the intrapredicted first area.

More specifically, the intraprediction unit 330 divides the current block into the at least two areas, performs intraprediction on pixels of the first area of the at least two areas using pixels of blocks neighboring the current block, and then calculates the average of the absolute differences values between the pixels of the first area in an edge direction to determine the edge direction of pixels of the first area around a pixel of the second area. The edge direction may be predetermined.

The intraprediction unit 330 interpolates the pixels of the second area using the average of the pixels of the first area positioned in the determined edge direction for intraprediction. The edge direction is the direction in which reference pixels of the first area used for interpolation of the pixels of the second area are positioned. In this way, when a prediction block is formed by performing intraprediction on a portion of the current block to be intrapredicted and then performing directional interpolation on the remaining portion of the current block, prediction efficiency is improved because the prediction block is formed based on pixel information of the current block.

The control unit 325 controls components of the video encoder 300 and determines the intraprediction mode for the current block. It is advantageous that this prediction mode minimizes the difference between the intrapredicted block and the original block. To achieve this, the control unit 325 calculates the costs of an interpredicted video and an intrapredicted video and determines the prediction mode which has the smallest cost to be the final prediction mode. Here, cost calculation may be performed using various methods such as a sum of absolute difference (SAD) cost function, a sum of absolute transformed difference (SATD) cost function, a sum of squares difference (SSD) cost function, a mean of absolute difference (MAD) cost function, a Lagrange cost function, or other such cost function. An SAD is a sum of absolute values of prediction residues of 4×4 blocks. An SATD is a sum of absolute values of coefficients obtained by applying a Hadamard transform to prediction residues of 4×4 blocks. An SSD is a sum of the squares of prediction residues of 4×4 block prediction samples. An MAD is an average of absolute values of prediction residues of 4×4 block prediction samples. The Lagrange cost function is a modified cost function including bitstream length information.

Once prediction data to be referred to by a macroblock of the current frame is found through interprediction or intraprediction, it is extracted from the macroblock of the current frame, transformed by the transformation unit 308, and then quantized by the quantization unit 310. The portion of the macroblock of the current frame remaining after subtracting a motion-estimated reference block is referred to as a residue. In general, the residue is encoded to reduce the amount of data in video encoding. The quantized residue is processed by the rearrangement unit 312 and encoded in the entropy-encoding unit 314.

To obtain a reference picture used for interprediction, a quantized picture is processed by the inverse quantization unit 316 and the inverse transformation unit 318, and thus the current picture is reconstructed. The reconstructed current picture is processed by the filter 320 performing deblocking filtering, and is then stored in the frame memory 322 for use in interprediction of the next picture. Reconstructed video data of the first area prior to deblocking filtering is input to the intraprediction unit 330 for use in directional interpolation of the second area.

Figure 4:
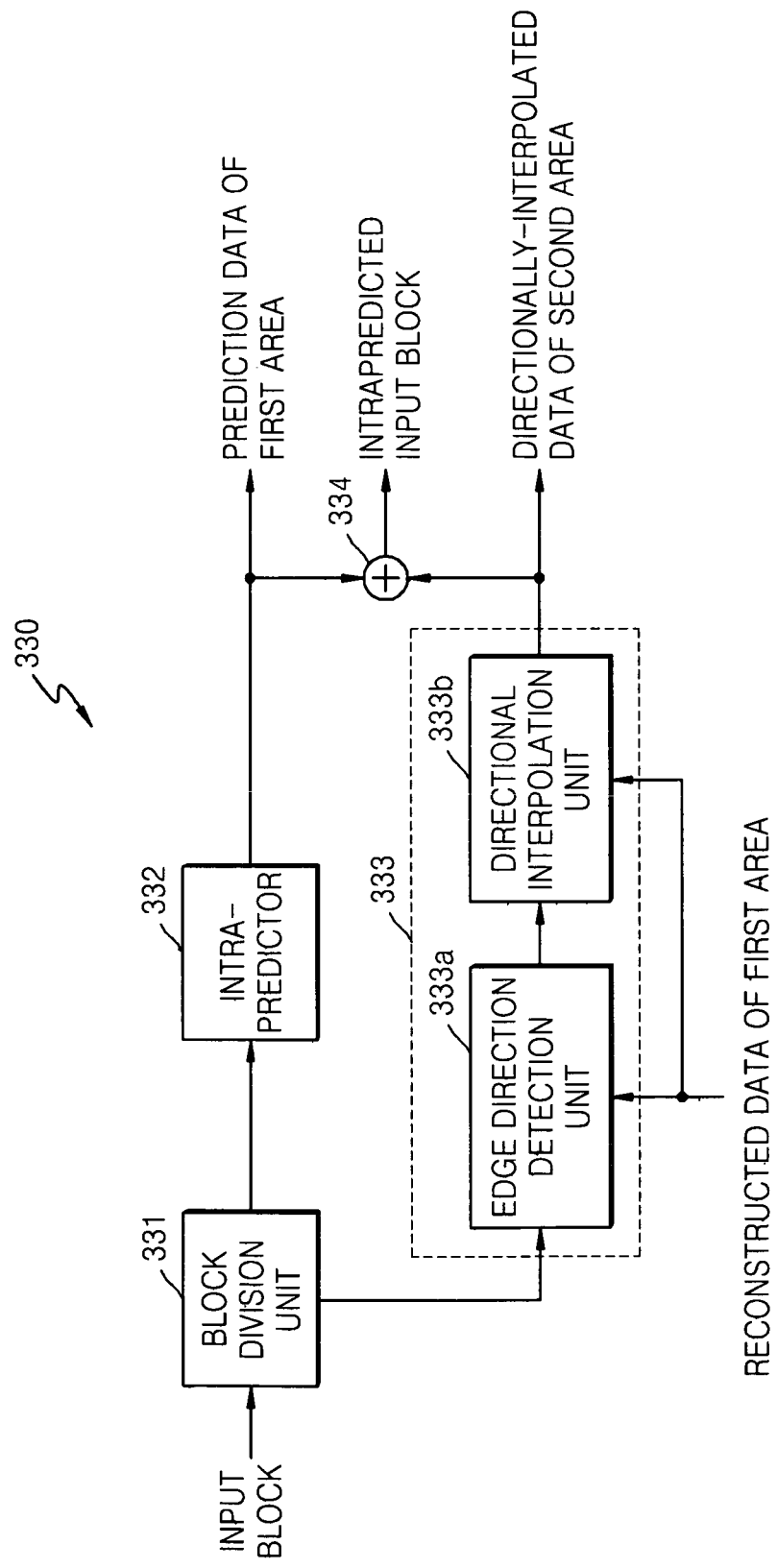
FIG. 4 is a block diagram of an intraprediction unit of FIG. 3 according to an exemplary embodiment of the present invention.

FIG. 4 is a block diagram of the intraprediction unit 330 of FIG. 3 according to the present invention, and FIGS. 5A through 5D illustrate division of an input block, performed by a block division unit 331 of FIG. 4.

Referring to FIG. 4, the intraprediction unit 330 includes the block division unit 331, an intrapredictor 332, an interpolation unit 333, and an addition unit 334.

Figure 5A:
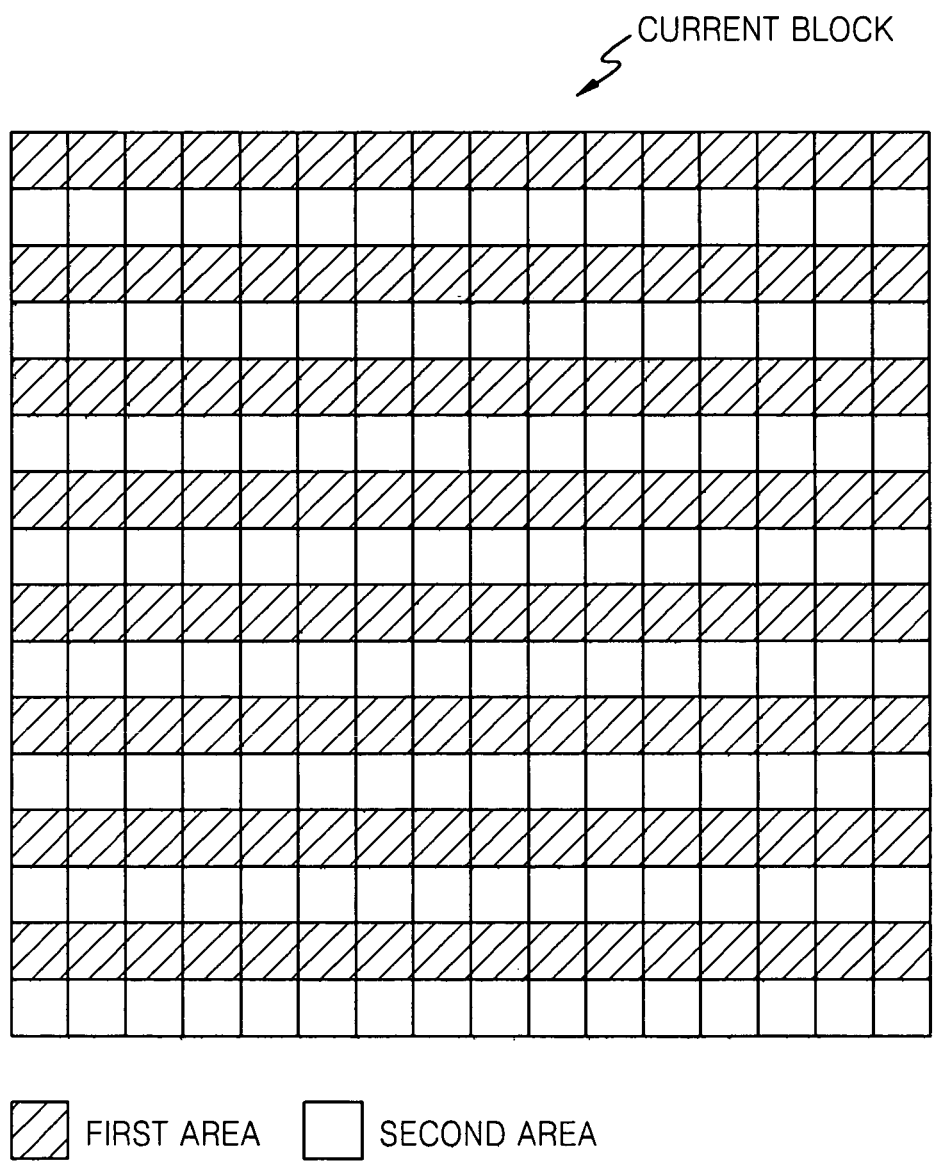
FIGS. 5A through 5D illustrate division of an input block, performed by a block division unit of FIG. 4.
Figure 5B:
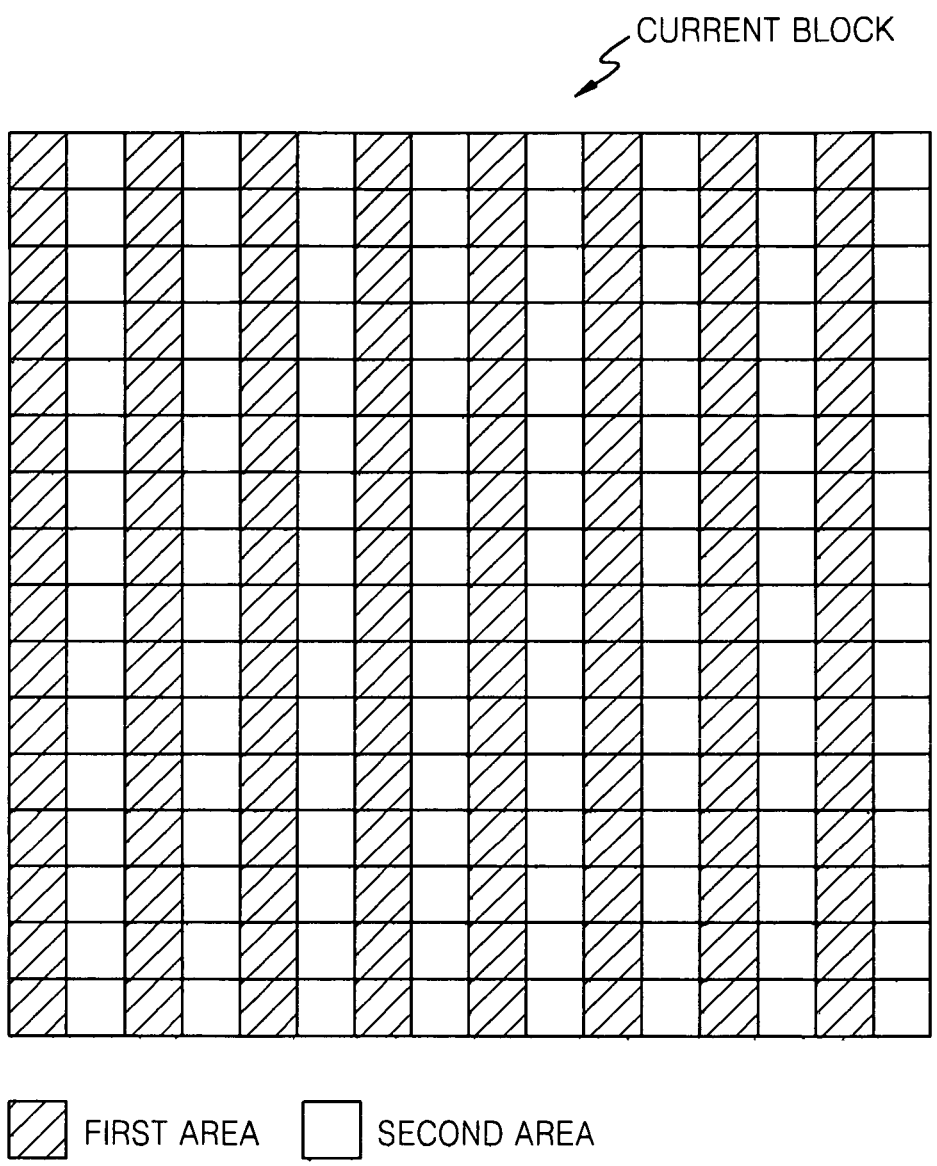
Figure 5C:
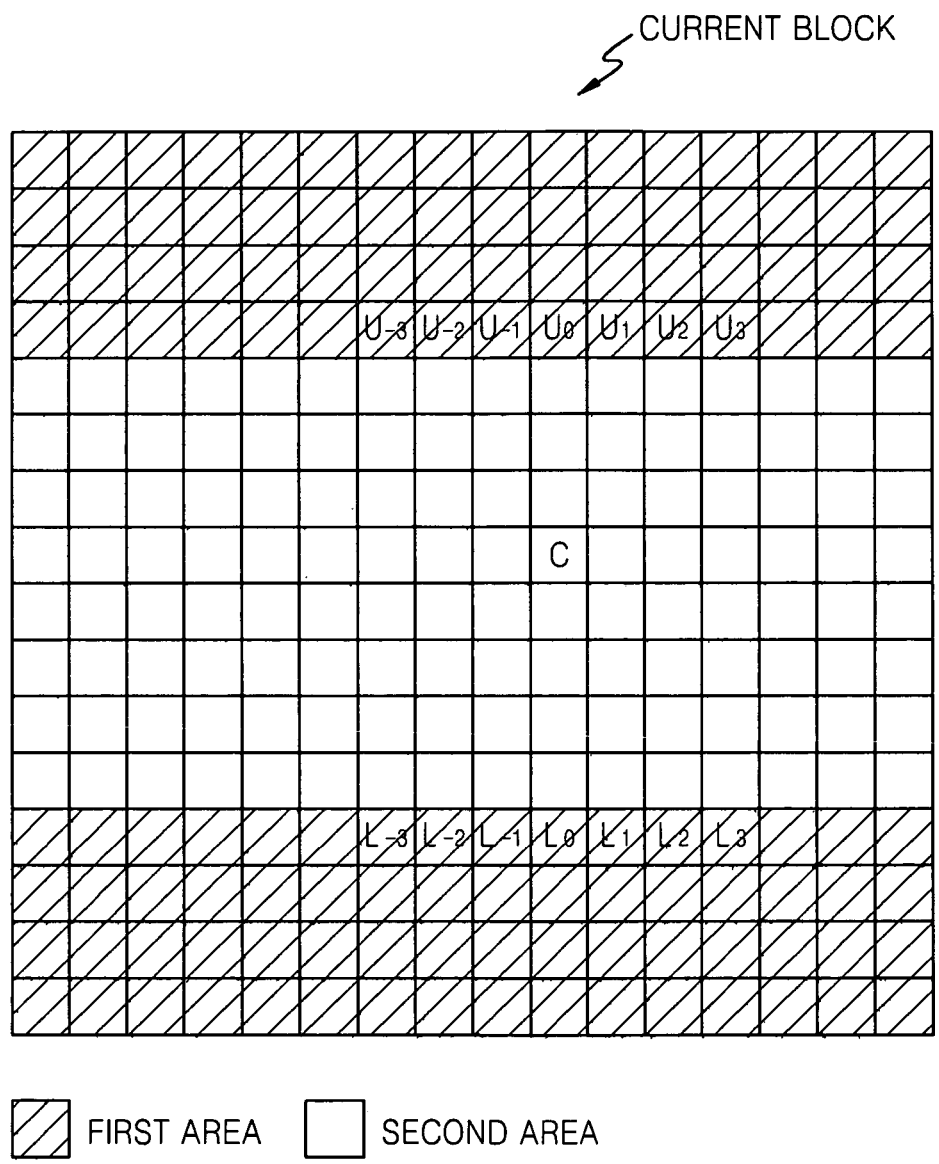
Figure 5D:
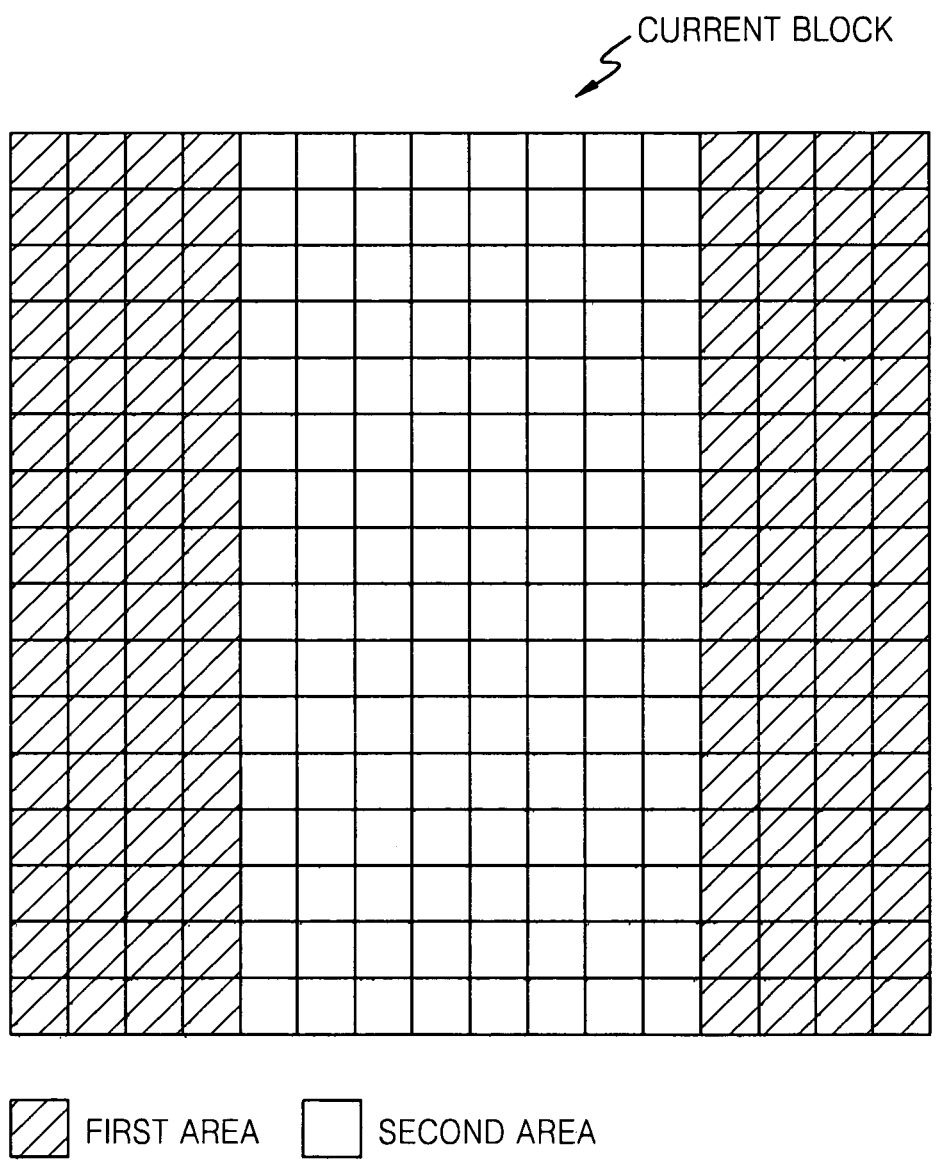

The block division unit 331 divides an input current block into at least two areas. For example, as illustrated in FIG. 5A, the block division unit 331 may divide the current block into a first area including odd-numbered horizontal lines and a second area including even-numbered horizontal lines. As illustrated in FIG. 5B, the block division unit 331 may alternatively divide the current block into a first area including odd-numbered vertical lines and a second area including even-numbered vertical lines. As illustrated in FIG. 5C, the block division unit 331 may also alternatively divide the current block into a first area including top and bottom horizontal border lines and a second area between the top and bottom horizontal border lines. As illustrated in FIG. 5D, the block division unit 331 may, as another alternative, divide the current block into a first area including left and right vertical border lines and a second area between the left and right vertical border lines. The divisions of an input block illustrated in FIGS. 5A through 5D are only examples, and the block division unit 331 may divide the input block into areas of various patterns. In addition, the first area and the second area may be interchanged.

The intraprediction unit, 332 first performs intraprediction on pixels of the first area using pixels of a block neighboring the current block. At this time, intraprediction according to the H.264 standard or other intraprediction methods using pixels of neighboring blocks may be applied. In the following description, intraprediction according to the H.264 standard is used as an illustrative example.

Figure 6:
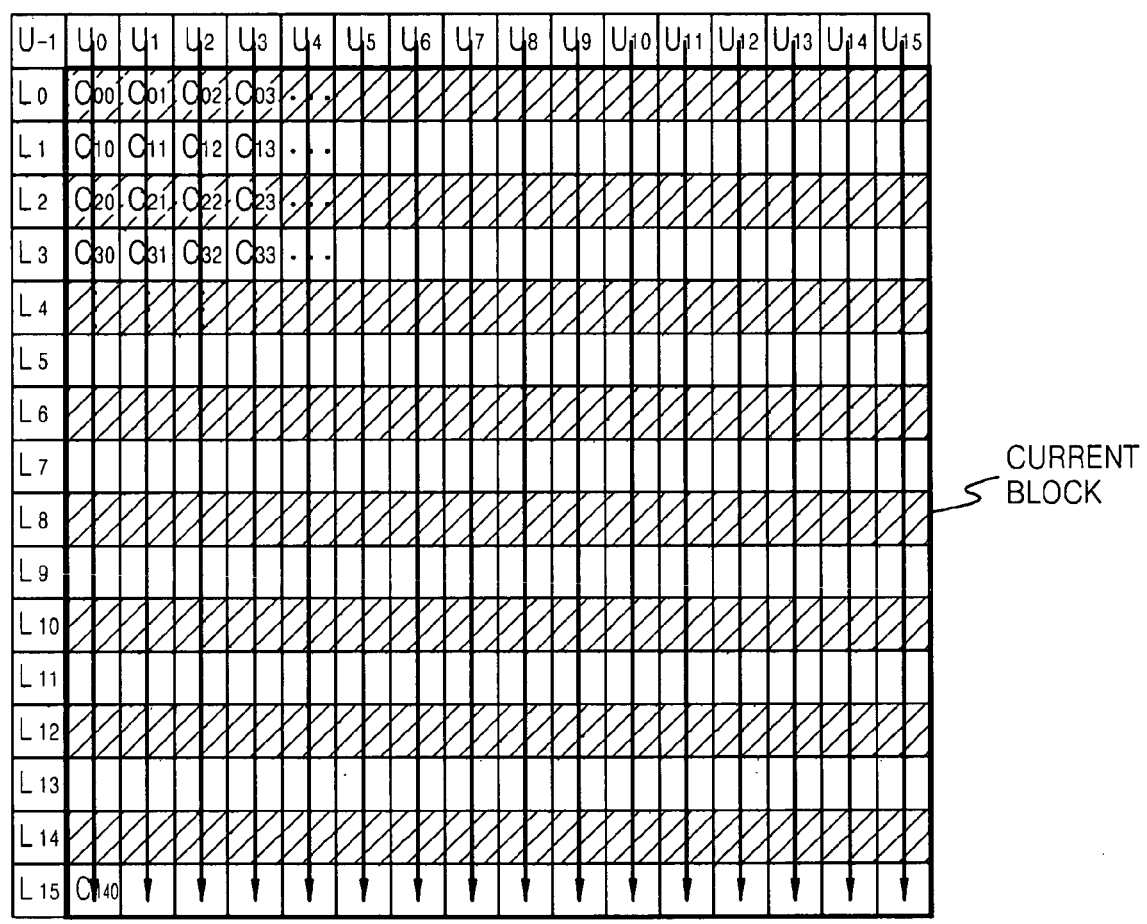
FIG. 6 illustrates intraprediction of an input block divided as illustrated in FIG. 5A, performed by an intrapredictor of FIG. 4.

FIG. 6 illustrates intraprediction of an input current block divided as illustrated in FIG. 5A, performed by the intrapredictor 332 of FIG. 4.

In FIG. 6, pixels of the first area are intrapredicted according to a vertical mode among the intraprediction modes of the H.264 standards. In intraprediction according to the vertical mode, the intrapredictor 332 first predicts pixel values of pixels $U_0$ through $U_{15}$ adjacent above the current block to be the pixel values of the pixels of the first area. In other words, the pixel value of the pixel $U_0$ is predicted to be the pixel values of eight pixels of the first column of the first area, the pixel value of the pixel $U_1$ is predicted to be the pixel values of eight pixels of the second column of the first area, and the pixel value of the pixel $U_2$ is predicted to be the pixel values of eight pixels of the third column of the first area, and so on. In other words, pixels $C_{00}, C_{20}, C_{40}, \ldots, C_{140}$ have the same prediction value as the pixel $U_0$ of a neighboring block located above the current block. Similarly, pixels $C_{01}, C_{21}, C_{41}, \ldots, C_{141}$ have the same prediction value as the pixel $U_1$, and pixels $C_{02}, C_{22}, C_{42}, \ldots, C_{142}$ have the same prediction value as the pixel $U_2$, and so on. In addition, the pixel values of pixels of the fourth through sixteenth columns of the first area are predicted from the pixel values of pixels $U_3$ through $U_{15}$ of the neighboring block located above the current block. Although not shown in the figures, after the intrapredictor 332 performs intraprediction according to various intraprediction modes such as a horizontal mode, it compares the costs of the intraprediction modes according to the difference between an image of the intrapredicted first area and a portion of the original image corresponding to the first area in each intraprediction mode, to determine the intraprediction mode for the first area.

The intrapredictor 332 may perform intraprediction not only on a 16×16 block but also on an 8×8 block or a 4×4 block using pixels of neighboring blocks.

The residue between video data of the intrapredicted first area and video data of the current block corresponding to the first area is transformed by the transformation unit 308 and then quantized by the quantization unit 310. When the transformation unit 308 transforms a 16×8 first area as illustrated in FIG. 6, it may perform 8×8 transformation twice or 4×4 transformation eight times. The transformation unit 308 may also perform transformation of various block sizes. The quantized residual video data of the first area undergoes inverse quantization in the inverse quantization unit 316 and inverse transform in the inverse transformation unit 318, is added to prediction video data of the intrapredicted first area for reconstruction, and is then input to the intraprediction unit 330.

The interpolation unit 333 receives reconstructed video data of the first area and calculates prediction values for pixels of the second area except for an image corresponding to the first area. Since the pixels of the first area are intrapredicted by the intrapredictor 332 and then reconstructed through transformation, quantization, inverse quantization, and inverse transformation, they are available for processing the pixels of the second area.

The interpolation unit 333 includes an edge direction detection unit 333a and a directional interpolation unit 333b. The edge direction detection unit 333a sets a plurality of edge directions around the current pixel to be interpolated in the second area, calculates the average of the absolute differences values between the pixels of the first area around the current pixel in each of the edge directions, and compares the calculated averages to determine which edge direction has the minimum average. Also, the edge direction detection unit 333a may use other edge direction detection methods using pixels of the first area. The directional interpolation unit 333b interpolates the pixel of the second area using the average of pixels of the first area positioned in the determined edge direction around the pixel of the second area.

Figure 7:
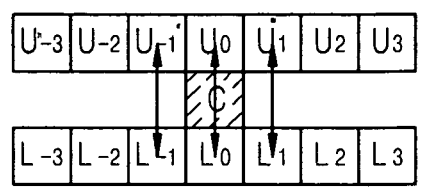
FIGS. 7 through 9 illustrate the detection of the edge direction of pixels according to an exemplary embodiment of the present invention.
Figure 8:
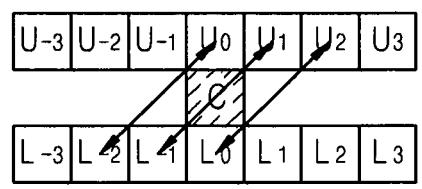
Figure 9:
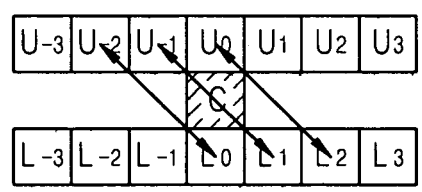

FIGS. 7 through 9 illustrate the detection of the edge direction of pixels in the first area around the current pixel to be interpolated in the second area, performed by the edge direction detection unit 333a according to an exemplary embodiment of the present invention. In FIGS. 7 through 9, a reference numeral C indicates the current pixel to be interpolated in the second area, $U_{-3}$, $U_{-2}$, $U_{-1}$, $U_0$, $U_1$, $U_2$, and $U_3$ indicate pixels of the first area located above the pixel C, and $L_{-3}$, $L_{-2}$, $L_{-1}$, $L_0$, $L_1$, $L_2$, and $L_3$ indicate pixels of the first area located below the pixel C.

Referring to FIGS. 7 through 9, the edge direction detection unit 333a detects an edge direction in 90°, 45°, and 135° directions using the pixels $U_{-3}$, $U_{-2}$, $U_{-1}$, $U_0$, $U_1$, $U_2$, $U_3$, and $L_{-3}$, $L_{-2}$, $L_{-1}$, $L_0$, $L_1$, $L_2$, $L_3$ of the first area around the pixel C of the second area as follows:

$$D_{90}=(|U_{-1}-L_{-1}|+|U_0-L_0|+|U_1-L_1|)/3$$

$$D_{45}=(|U_0-L_{-2}|+|U_1-L_{-1}|+|U_2-L_0|)/3$$

$$D_{135}=(|U_2-L_0|+|U_{-1}-L_1|+|U_0-L_2|)/3 \quad (1),$$

where $D_{90}$, $D_{45}$, and $D_{135}$ indicate the averages of the absolute differences between pixels of the first area positioned in 90°, 45°, and 135° directions around the pixel C of the second area, respectively.

The edge direction detection unit 333a compares the values of $D_{90}$, $D_{45}$, and $D_{135}$ and determines which edge direction has a minimum average D_Min. In other words, to detect an edge direction, the edge direction detection unit 333a calculates the average of the absolute differences between the pixels of the first area around the pixel C in each of a plurality of edge directions, and determines which edge direction has the minimum average. However, the edge direction detection unit 333a may detect edge directions of various angles without being limited to the angles in the above description.

The directional interpolation unit 333b interpolates the average of pixels passing through the pixel C of the second area among the pixels of the first area positioned in the determined edge direction into the pixel C of the second area. For example, when D_Min=$D_{90}$, the pixel C of the second area has a pixel value of $(U_0+L_0)/2$. Similarly, when D_Min=$D_{45}$, the pixel C of the second area has a pixel value of $(U_1+L_{-1})/2$ and the pixel C of the second area has a pixel value of $(U_{-1}+L_1)/2$. The interpolation process described above is based on the fact that adjacent pixels in an edge direction have high correlation and thus have similar pixel values.

When an edge direction is detected in 90°, 45°, and 135° directions but not horizontally, if the minimum average D_Min is greater than a threshold Th, which may be predetermined, the horizontal direction may be determined to be the edge direction. In this case, a reconstructed pixel value of a pixel that is closest on the left to the pixel C of the second area, among available pixels of a neighboring block or the current block, may be used. For example, in FIG. 6, when the minimum average D_Min of the pixels of the first area around the current pixel $C_{10}$ of the second area is greater than a threshold Th, a pixel $L_1$ of a neighboring block that is closest on the left to the pixel $C_{10}$ of the second area is used for interpolation. In other words, the pixel $C_{10}$ of the second area is predicted to be the pixel value of the pixel $L_1$.

When the second area is processed in units of 4×4 blocks and the edge direction of the pixels of the first area around the current pixel to be interpolated in the second area is determined to be the horizontal direction, interpolation may be performed using the pixel value of a previously interpolated pixel located to the left of the current pixel. For example, in FIG. 6, the edge direction of pixels of the first area around the current pixel $C_{11}$ of the second area is determined to be the horizontal direction, and previously decoded data of the first area does not exist in the horizontal direction from the pixel $C_{11}$. Thus, a pixel value of an interpolated pixel $C_{10}'$ may be used as a prediction value for the pixel $C_{11}$.

Through the process described above, prediction data of the first area intrapredicted by the intrapredictor 332, and data of the second area directionally interpolated by the interpolation unit 333, are added by the addition unit 334, and thus an intrapredicted current block is output.

Intraprediction according to an exemplary embodiment of the present invention may also be applied when the current block is divided as illustrated in FIG. 5B. Also, when the current block is divided as illustrated in FIG. 5C, pixels of the first area adjacent above and below the current pixel C of the second area do not exist, but an edge direction is detected using the pixels $U_{-3}$, $U_{-2}$, $U_{-1}$, $U_0$, $U_1$, $U_2$, $U_3$, and $L_{-3}$, $L_{-2}$, $L_{-1}$, $L_0$, $L_1$, $L_2$, and $L_3$ of the first area around the pixel C of the second area using Equation 1, and a pixel to be used for interpolation of the pixel C of the second area is determined from among the pixels $U_{-3}, U_{-2}, U_{-1}, U_0, U_1, U_2, U_3,$ and $L_{-3}, L_{-2}, L_{-1}, L_0, L_1, L_2,$ and $L_3$ of the first area for directional interpolation.

According to an exemplary embodiment of the present invention, intraprediction with respect to the second area is performed for each pixel, and a prediction mode is determined for each pixel. In addition, according to an exemplary embodiment of the present invention, since a prediction mode is determined for each pixel through edge direction detection, it is not necessary to additionally transmit prediction mode information to a video decoder.

Figure 10:
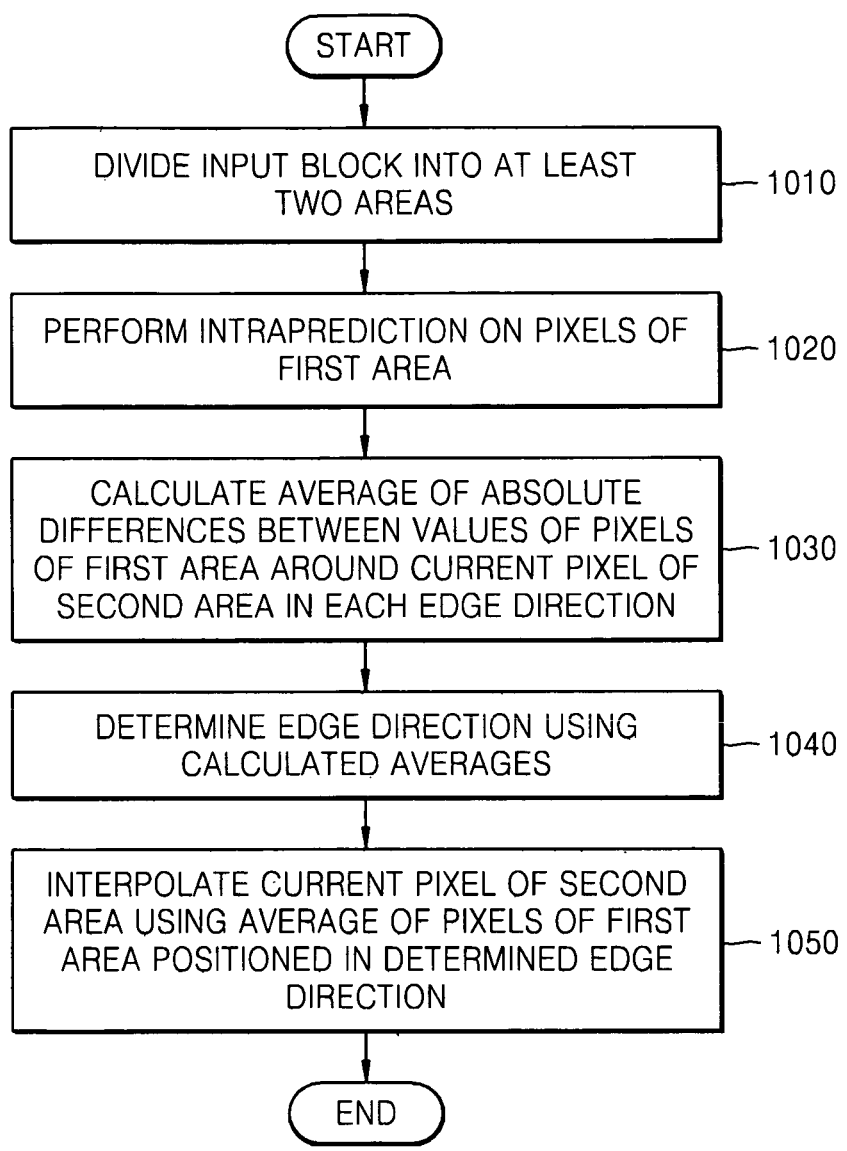
FIG. 10 is a flowchart illustrating a method of video intraprediction encoding using directional interpolation according to an exemplary embodiment of the present invention.

FIG. 10 is a flowchart illustrating a method of video intraprediction encoding using directional interpolation according to an exemplary embodiment of the present invention.

Referring to FIG. 10, an input current block is divided into at least two areas in operation 1010. Here, an area that is subject to intraprediction using pixels of a block neighboring the current block will be referred to as a first area, and an area that is subject to directional interpolation using reconstructed data of the first area will be referred to as a second area.

In operation 1020, intraprediction is performed on pixels of the first area using pixels of the neighboring block.

In operation 1030, a plurality of edge directions are set around the current pixel to be interpolated in the second area, and the average of the absolute differences between the pixels of the first area around the current pixel of the second area is calculated in each of the edge directions, to determine the spatial characteristics of the pixels of the first area around the current pixel of the second area and to determine reference pixels of the first area used for prediction of the current pixel of the second area based on the spatial characteristics. As stated above, the average of the differences between the absolute values can be calculated using Equation 1.

In operation 1040, the edge direction which has the minimum average among the calculated averages of the differences between the absolute values of the pixels of the first area is determined. However, as mentioned above, various methods may be used for edge direction determination using pixels of the first area in operations 1030 and 1040.

In operation 1050, the current pixel of the second area is interpolated using the average of pixels of the first area positioned in the determined edge direction. In other words, the pixels of the first area positioned in the determined edge direction are used as reference pixels for prediction of the second area.

Intraprediction according to an exemplary embodiment of the present invention may have a larger residue than intraprediction according to the conventional art. In this case, for adaptive application of intraprediction according to an exemplary embodiment of the present invention, flag information for each block may be added to a header of an encoded bitstream. For example, a 1-bit flag is set for each 8×8 block, and 1 is added to the header of an encoded bitstream when intraprediction according to an exemplary embodiment of the present invention is used. Here, when the flag is 0, i.e., intraprediction according to the conventional art is used, direction mode information is additionally transmitted. When the flag is 1, i.e., intraprediction according to an exemplary embodiment of the present invention is used, the encoded bitstream is processed without the direction mode information. This is because direction information required for interpolation of a pixel of the second area can be obtained during detection of the edge direction of pixels of the first area in intraprediction encoding according to an exemplary embodiment of the present invention.

Figure 11:
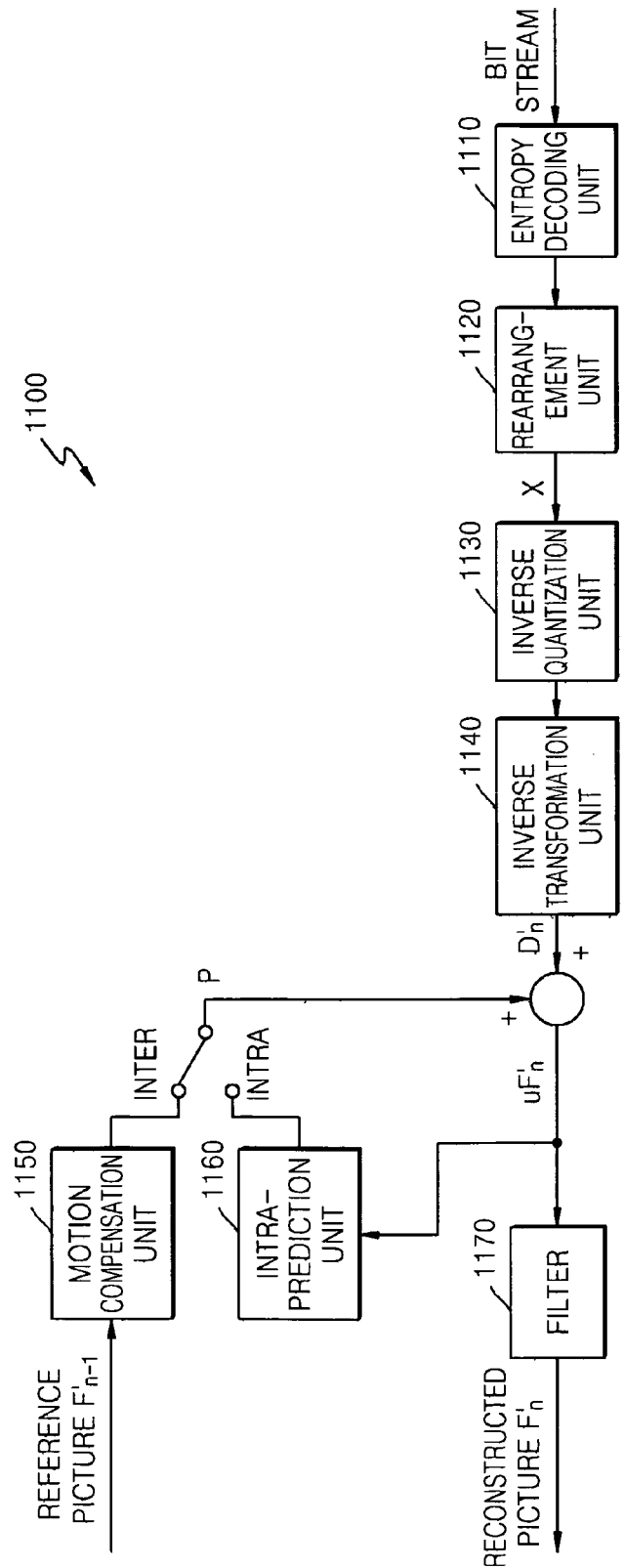
FIG. 11 is a block diagram of a video decoder which uses an apparatus for video intraprediction decoding according to an exemplary embodiment of the present invention.

FIG. 11 is a block diagram of a video decoder 1100 which uses an apparatus for video intraprediction decoding according to an exemplary embodiment of the present invention.

Referring to FIG. 11, the video decoder 1100 includes an entropy-decoding unit 1110, a rearrangement unit 1120, an inverse quantization unit 1130, an inverse transformation unit 1140, a motion compensation unit 1150, an intraprediction unit 1160, and a filter 1170.

The entropy-decoding unit 1110 and the rearrangement unit 1120 receive a compressed bitstream and perform entropy decoding, thereby generating a quantized coefficient X. The inverse quantization unit 1130 and the inverse transformation unit 1140 perform inverse quantization and an inverse transformation on the quantized coefficient X, thereby extracting transformation encoding coefficients, motion vector information, and header information. The motion compensation unit 1150 and the intraprediction unit 1160 generate a predicted block according to an encoded picture type using the decoded header information, and the predicted block is added to an error $D'_n$ to generate $uF'_n$. The $uF'_n$ is processed by the filter 1170, and thus a reconstructed picture $F'_n$ is generated.

The intraprediction unit 1160 determines an intraprediction mode, which was used in encoding the current block to be decoded, using the intraprediction mode information included in a received bitstream. When the received bitstream has been intrapredicted using directional interpolation according to an exemplary embodiment of the present invention, the intraprediction unit 1160 performs intraprediction decoding on pixels of the first area and decodes pixels of the second area through directional interpolation of decoded pixels of the first area.

Figure 12:
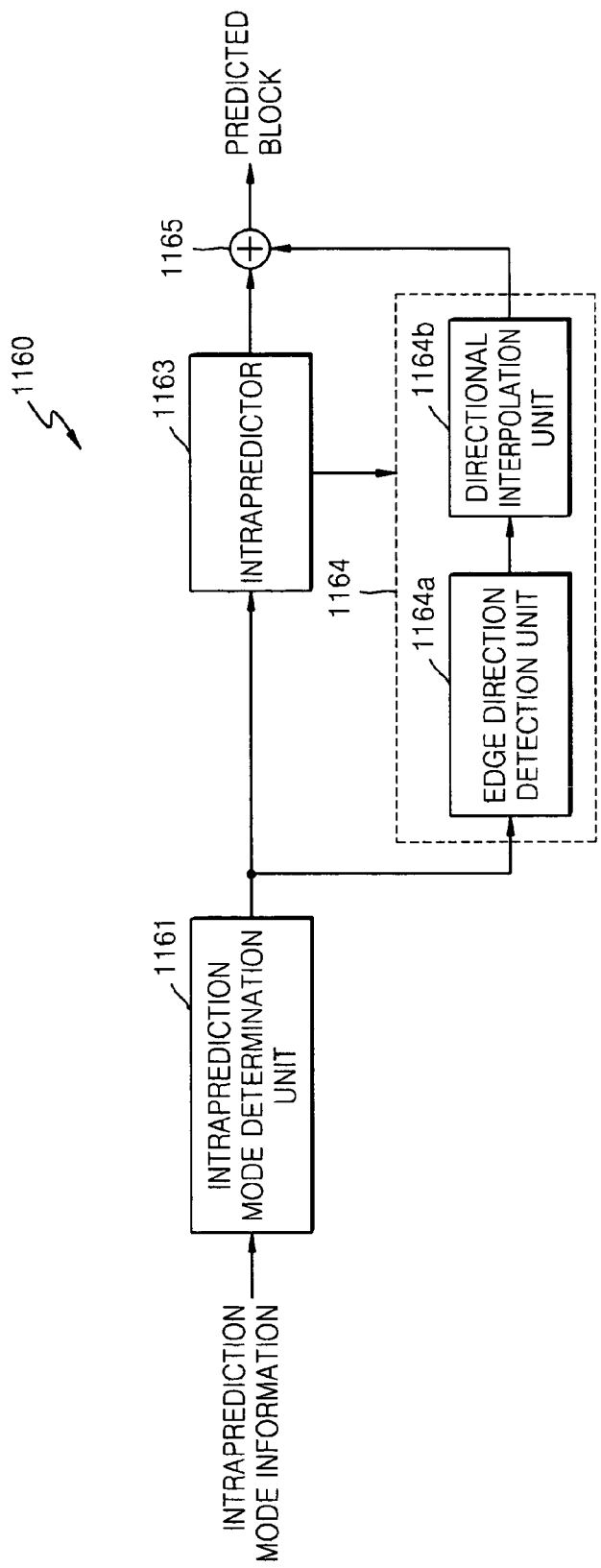
FIG. 12 is a block diagram of an intraprediction unit of FIG. 11 according to an exemplary embodiment of the present invention.

FIG. 12 is a block diagram of the intraprediction unit 1160 of FIG. 11 according to an exemplary embodiment of the present invention.

Referring to FIG. 12, the intraprediction unit 1160 includes an intraprediction mode determination unit 1161, an intrapredictor 1163, and an interpolation unit 1164.

The intraprediction mode determination unit 1161 determines the intraprediction mode in which the current block to be intraprediction-decoded has been intraprediction-encoded based on the intraprediction mode information extracted from the received bitstream. A video decoder that decodes only a compressed bitstream in which each block is divided into at least two areas according to an exemplary embodiment of the present invention can be implemented without the intraprediction mode determination unit 1161. When the determined intraprediction mode is an intraprediction mode according to the conventional art, the intrapredictor 1163 performs intraprediction decoding on the received bitstream according to the conventional art.

When the received bitstream is intraprediction-encoded according to an exemplary embodiment of the present invention, the intrapredictor 1163 first performs intraprediction-decoding on the first area using data included in the received bitstream. Data for the first area decoded by the intrapredictor 1163 is input to the interpolation unit 1164.

The interpolation unit 1164 includes an edge direction detection unit 1164a and a directional interpolation unit 1164b. The edge direction detection unit 1164a sets a plurality of edge directions around the current pixel to be interpolated in the second area, calculates the average of the absolute differences between the pixels of the first area positioned around the current pixel of the second area in each of the edge directions, and compares the calculated averages to determine which edge direction has a minimum average. The directional interpolation unit 1164b interpolates the current pixel of the second area using the average of the pixels of the first area positioned in the determined edge direction. The function and operation of the interpolation unit 1164 are similar to those of the interpolation unit 333 of FIG. 4 used in the video encoder 300. The interpolation unit 1164 may also determine an edge direction using various other methods.

Data for the first area, decoded by the intrapredictor 1163, and data for the second area, directionally interpolated by the interpolation unit 1164, are added by the addition unit 1165, thereby forming an intrapredicted block. The residue included in the received bitstream is added to the intrapredicted block, thereby obtaining a reconstructed video.

Figure 13:
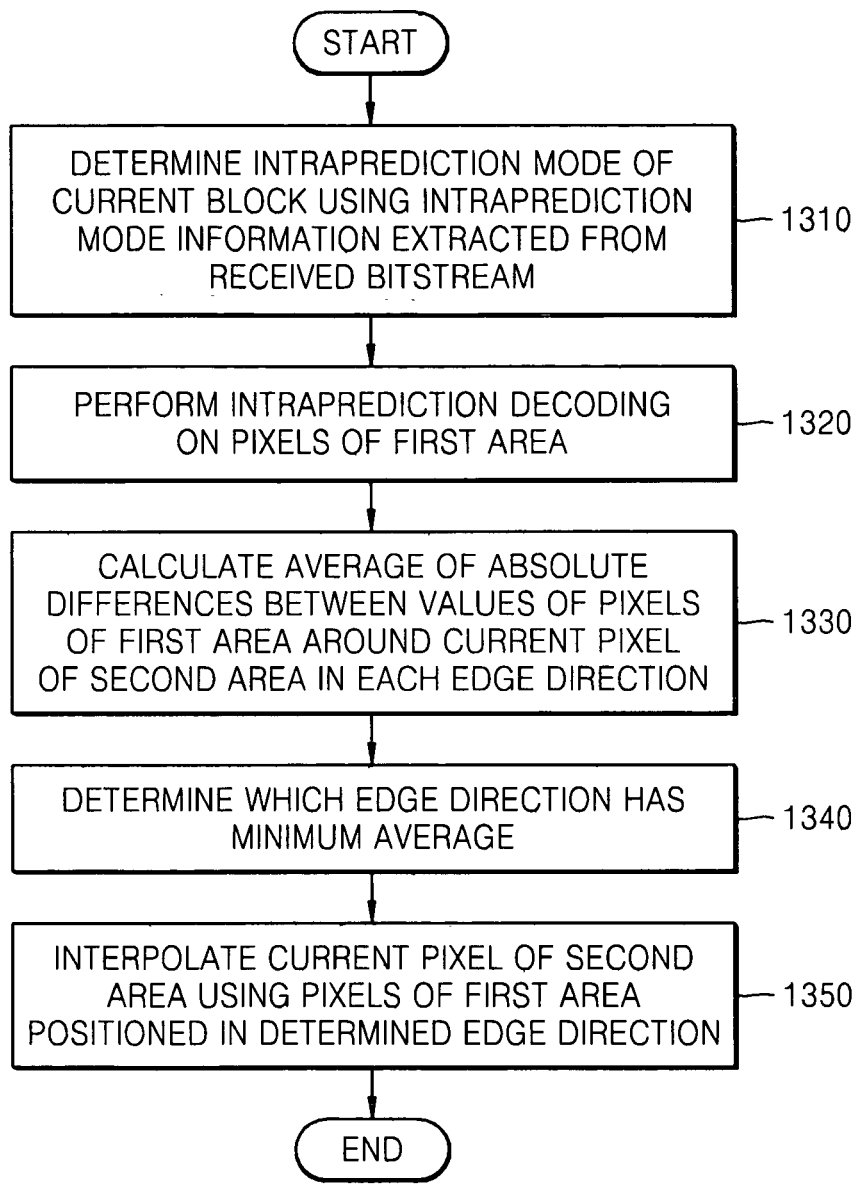
FIG. 13 is a flowchart illustrating a method of video intraprediction decoding using directional interpolation according to an exemplary embodiment of the present invention.

FIG. 13 is a flowchart illustrating a method of video intraprediction decoding using directional interpolation according to an exemplary embodiment of the present invention. As stated above, in the method of video intraprediction decoding according to an exemplary embodiment of the present invention, to decode a first area intrapredicted using pixels of neighboring blocks and a second area directionally interpolated from pixels of the first area, the first area is first intraprediction-decoded and pixels of the second area are directionally interpolated from the decoded pixels of the first area, thereby forming a decoded prediction block.

Referring to FIG. 13, intraprediction mode information included in a header of a received bitstream is extracted to determine the intraprediction mode of the current block in operation 1310.

In operation 1320, if the extracted intraprediction mode information indicates an intraprediction mode using directional interpolation according to an exemplary embodiment of the present invention, intraprediction decoding is performed on pixels of the first area from data included in the received bitstream. As mentioned above, an area that is subject to intraprediction using pixels of a neighboring block of the current block is referred to as the first area, and an area that is subject to directional interpolation using reconstructed data of the first area is referred to as the second area.

In operation 1330, a plurality of edge directions are set around the current pixel of the second area, and the average of the absolute differences between the values of intraprediction-decoded pixels of the first area around the current pixel of the second area is calculated in each of the edge directions. The average of the differences may be calculated using Equation 1.

In operation 1340, the edge direction which has the minimum average is determined. As mentioned above, the edge direction indicates the direction in which pixels of the first area used for interpolation of the current pixel of the second area are positioned. In operations 1330 and 1340, the edge direction may be determined using various methods.

In operation 1350, the current pixel of the second area is interpolated using pixels of the first area positioned in the determined edge direction. As in the intraprediction encoding described above, the current pixel of the second area may be interpolated using the average of pixels of the first area positioned in the determined edge direction.

As described above, according to exemplary embodiments of the present invention, since intraprediction is performed by interpolating pixels of the current block having high correlation, a prediction block that is more similar to the current block can be formed, thereby improving coding efficiency.

Furthermore, according to exemplary embodiments of the present invention, video intraprediction uses not only pixel information of neighboring blocks but also pixel information of the current block to be intrapredicted, thereby improving prediction efficiency and coding efficiency.

The present inventive concept can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

While the present inventive concept has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of video intraprediction encoding, the method comprising:
    dividing an input block into at least two areas;
    performing intraprediction encoding on pixels of a first area of the at least two areas using pixels of a neighboring block and not performing intraprediction encoding on pixels of the second area;
    reconstructing the pixels of the first area;
    determining spatial characteristics of pixels of the intraprediction-encoded and reconstructed first area around a pixel of the second area of the at least two areas;
    determining reference pixels of the intraprediction-encoded and reconstructed first area for prediction of the pixel of the second area based on the spatial characteristics;
    predicting the pixel of the second area based on the determined reference pixels of the intraprediction-encoded and reconstructed first area;
    obtaining a final intraprediction block by combining the predicted pixels of the first area and the predicted pixels of the second area; and
    encoding a residual block which indicates a difference between the input block and the final intraprediction block;
    wherein when the intraprediction encoding is performed on the input block, a flag indicating an intraprediction mode which performs intraprediction encoding on pixels of the first area of the at least two areas using pixels of the neighboring block and not performing intraprediction encoding on pixels of the second area is added to a header of a bitstream.

2. The method of claim 1, wherein the spatial characteristics of the pixels of the intraprediction-encoded and reconstructed first area indicate a direction of the pixels of the first area around the pixel of the second area.

3. The method of claim 1, wherein the determining of the reference pixels of the intraprediction-encoded and reconstructed first area comprises:
    setting a plurality of directions around the pixel of the second area and calculating an average of absolute differences between values of the pixels of the intraprediction-encoded and reconstructed first area around the pixel of the second area in each of the plurality of directions; and
    comparing the calculated averages to determine which direction has a minimum average, and determining the reference pixels of the intraprediction-encoded and reconstructed first area for prediction of the pixel of the second area based on the determined direction.

4. The method of claim 1, wherein the pixel of the second area is predicted using an average of the determined reference pixels of the intraprediction-encoded and reconstructed first area around the pixel of the second area.

5. The method of claim 1, wherein the first area comprises even-numbered horizontal lines and the second area comprises odd-numbered horizontal lines of the input block, or the first area comprises odd-numbered horizontal lines and the second area comprises even-numbered horizontal lines of the input block.

6. The method of claim 1, wherein the first area comprises even-numbered vertical lines and the second area comprises odd-numbered vertical lines of the input block, or the first area comprises odd-numbered vertical lines and the second area comprises even-numbered vertical lines of the input block.

7. The method of claim 1, wherein the first area comprises top and bottom horizontal border lines of the input block, and the second area comprises horizontal lines between the top and bottom horizontal border lines.

8. The method of claim 1, wherein the first area comprises left and right vertical border lines of the input block, and the second area comprises vertical lines between the left and right vertical border lines.

9. An apparatus for video intraprediction encoding, the apparatus comprising:
a block division unit which divides an input block into at least two areas;
an intraprediction unit which performs intraprediction encoding on pixels of a first area of the at least two areas using pixels of a neighboring block and does not perform intraprediction on pixels of the second area, and reconstructs the pixels of the first area;
an interpolation unit which determines spatial characteristics of pixels of the intraprediction-encoded and reconstructed first area around a pixel of a second area of the at least two areas, determines reference pixels of the intraprediction-encoded and reconstructed first area for prediction of the pixel of the second area based on the spatial characteristics, and predicts the pixel of the second area based on the determined reference pixels of the intraprediction-encoded and reconstructed first area;
an addition unit which obtains a final intraprediction block by combining the predicted pixels of the first area and the predicted pixels of the second area; and
an encoder which encodes a residual block which indicates a difference between the input block and the final intraprediction block;
wherein when the intraprediction encoding is performed on the input block, a flag indicating an intraprediction mode which performs intraprediction encoding on pixels of the first area of the at least two areas using pixels of the neighboring block and not performing intraprediction encoding on pixels of the second area is added to a header of a bitstream.

10. The apparatus of claim 9, wherein the spatial characteristics of the pixels of the intraprediction-encoded and reconstructed first area indicate a direction of the pixels of the first area around the pixel of the second area.

11. The apparatus of claim 9, wherein the interpolation unit comprises:
an edge direction detection unit which sets a plurality of directions around the pixel of the second area, calculates the average of absolute differences between values of the pixels of the intraprediction-encoded and reconstructed first area around the pixel of the second area in each of the plurality of directions, compares the calculated averages to determine which direction has a minimum average, and determines the reference pixels of the intraprediction-encoded and reconstructed first area for prediction of the pixel of the second area based on the determined direction; and
a directional interpolation unit which predicts the pixel of the second area using an average of the determined reference pixels of the intraprediction-encoded and reconstructed first area around the pixel of the second area.

12. The apparatus of claim 9, wherein the first area comprises even-numbered horizontal lines and the second area comprises odd-numbered horizontal lines of the input block, or the first area comprises odd-numbered horizontal lines and the second area comprises even-numbered horizontal lines of the input block.

13. The apparatus of claim 9, wherein the first area comprises even-numbered vertical lines and the second area comprises odd-numbered vertical lines of the input block, or the first area comprises odd-numbered vertical lines and the second area comprises even-numbered vertical lines of the input block.

14. The apparatus of claim 9, wherein the first area comprises top and bottom horizontal border lines of the input block and the second area comprises horizontal lines between the top and bottom horizontal border lines.

15. The apparatus of claim 9, wherein the first area comprises left and right vertical border lines of the input block and the second area comprises vertical lines between the left and right vertical border lines.

16. A method of video intraprediction decoding, the method comprising:
receiving a bitstream including data for a first area of a block that is intraprediction-encoded using pixels of a neighboring block and reconstructed, and data for a second area of the block that is not intraprediction encoded but is predicted using pixel information of the intraprediction-encoded and reconstructed first area, and receiving a flag indicating an intraprediction mode of the block with performs intraprediction encoding on pixels of the first area of the at least two areas using pixels of the neighboring block and not performing intraprediction encoding on pixels of the second area;
performing intraprediction-decoding on pixels of the first area and determining whether to perform intraprediction-decoding on pixels of the second area based on the flag;
determining spatial characteristics of pixels of the intraprediction-decoded first area around a pixel of the second area and determining reference pixels of the intraprediction-decoded first area for prediction of the pixel of the second area based on the spatial characteristics;
predicting the pixel of the second area using the determined reference pixels of the first area;
obtaining a final intraprediction block by combining the predicted pixels of the first area and the predicted pixels of the second area; and
obtaining a residual block which indicates a difference between the block and the inal intraprediction block from the bitstream.

17. The method of claim 16, wherein the determining of the reference pixels of the intraprediction-decoded first area comprises setting a plurality of edge directions around the pixel of the second area, calculating the average of absolute differences between values of the intraprediction-decoded pixels of the first area around the pixel of the second area in each of the edge directions, and determining the reference pixels of the intraprediction-decoded first area positioned in an edge direction which has a minimum average of the calculated averages.

18. The method of claim 16, wherein the pixel of the second area is predicted using an average of the determined reference pixels of the intraprediction-decoded first area around the pixel of the second area.

19. The method of claim 16, wherein the second area of the block is predicted by directional interpolation using pixel information of the first area.

20. A method of video intraprediction decoding, the method comprising:
 receiving data for a first area of a block that is intraprediction-encoded using pixels of a neighboring block, and data for a second area of the block that is not intraprediction encoded, and a flag indicating an intraprediction mode of the block which performs intraprediction encoding on pixels of the first area of the at least two areas using pixels of the neighboring block and not performing intraprediction encoding on pixels of the second area;
 performing intraprediction-decoding on pixels of the first area;
 determining spatial characteristics of pixels of the intraprediction-decoded first area around a pixel of a second area of the block and determining reference pixels of the intraprediction-decoded first area for prediction of the pixel of the second area based on the spatial characteristics;
 predicting the pixel of the second area using the determined reference pixels of the intraprediction-decoded first area;
 obtaining a final intraprediction block by combining the predicted pixels of the first area and the predicted pixels of the second area; and
 obtaining a residual block which indicates a difference between the block and the inal intraprediction block from the bitstream.

21. The method of claim 20, wherein the pixel of the second area is predicted using an average of the determined reference pixels of the intraprediction-decoded first area around the pixel of the second area.

22. An apparatus for video intraprediction decoding, the apparatus comprising:
 an intraprediction unit which receives a bitstream including data for a first area of a block that is intraprediction-encoded using pixels of a neighboring block and data for a second area of the block that is not intraprediction encoded but is predicted using pixel information of the first area and a flag indicating an intraprediction mode of the block which performs intraprediction encoding on pixels of the first area of the at least two areas using pixels of the neighboring block and not performing intraprediction encoding on pixels of the second area, performs intraprediction-decoding on pixels of the first area and determines whether to perform intraprediction-decoding on pixels of the second area based on the flag;
 an interpolation unit which determines spatial characteristics of pixels of the intraprediction-decoded first area around a pixel of the second area, determines reference pixels of the intraprediction-decoded first area for prediction of the pixel of the second area based on the spatial characteristics, and predicts the pixel of the second area using the determined reference pixels of the first area; and
 an addition unit which obtains a final intraprediction block by combining the prediced pixels of the first area and the predicted pixels of the second area.

23. The apparatus of claim 22, wherein the interpolation unit comprises:
 an edge direction detection unit which sets a plurality of edge directions around the pixel of the second area, calculates the average of absolute differences between the values of the intraprediction-decoded pixels of the first area around the pixel of the second area in each of the edge directions, and determines the reference pixels of the intraprediction-decoded first area positioned in the edge direction which has the minimum average; and
 a directional interpolation unit which predicts the pixel of the second area using an average of the determined reference pixels of the intraprediction-decoded first area around the pixel of the second area.

24. The apparatus of claim 22, wherein the second area of the block is predicted by directional interpolation using pixel information of the first area.

* * * * *